T. A. EDISON.

Improvement in Unison-Stops for Printing-Telegraphs.

No. 131,344. Patented Sep. 17, 1872.

INVENTOR
Thomas A. Edison,
Per. Lemuel W. Serrell
ATTY.

Witnesses.
Chas. H. Smith
Harold Serrell

UNITED STATES PATENT OFFICE.

THOMAS A. EDISON, OF NEWARK, NEW JERSEY.

IMPROVEMENT IN UNISON-STOPS FOR PRINTING-TELEGRAPHS.

Specification forming part of Letters Patent No. 131,344, dated September 17, 1872.

*To all whom it may concern:*

Be it known that I, THOMAS A. EDISON, of Newark, in the county of Essex and State of New Jersey, have invented an Improvement in Printing-Telegraphs; and the following is declared to be a correct description of the same.

This invention is devised for rotating the type-wheel around to a unison-point by the action of a wedge-shaped tooth on the printing-lever operating upon a toothed wheel on the type-wheel shaft; thereby a number of machines in an electric-circuit are brought to a unison-point by pulsations through the printing-lever.

Figure 1:
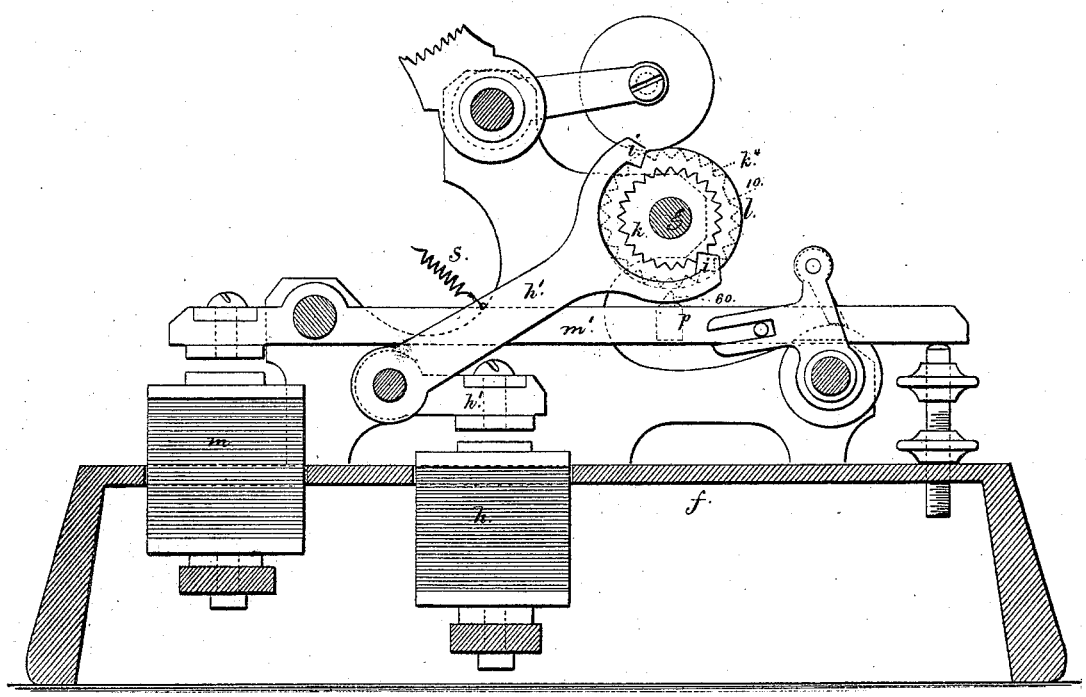
Figure 2:
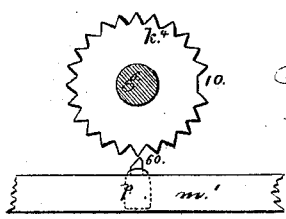

In the drawing, Figure 1 is a section showing the type-wheel and wedge-acting escapement, and Fig. 2 is a detached view of the unison-wheel and tooth.

The bed $f$, type-wheel $l$, shaft $g$, printing-magnet $m$, type-wheel magnet $h$, and printing-lever $m'$, are of the usual character. The wedge-acting pallets $i\,i$ of the type-wheel lever $h'$ act upon the ratchet-wheel $k$, and give the type-wheel $l$ a progressive movement, step by step, the pallets $i$ being placed so that the type-wheel is moved half a space as the magnet $h$ is energized, and the other half space is moved by the spring $s$ acting upon the lever $h'$, when the pulsation in $h$ is arrested. Upon the printing-lever $m'$ is a pallet or tooth, 60, and upon the type-wheel shaft $g$ is a toothed wheel, $k^4$, with one tooth removed at the point where the type-wheels will be brought into unison.

The operation is as follows: Ordinarily the impression from the type-wheel by the printing-pad $p$ will be made when the circuit through $h$ is broken, and the parts in the position shown in Fig. 1, in which case the tooth 60 moves in between the teeth of $k^4$ without acting to turn the same; but when the machines are to be brought to unison, the circuit through $h$ is kept closed, and the pallet $i$ moves the type-wheel $l$ and wheel $k^4$ half a space, so that the latter is in the position to the tooth 60, shown in Fig. 2; the printing-magnet $m$ is then energized by a series of pulsations, and as the printing-lever $m'$ moves, the tooth 60 rotates the wheel $k^4$ and type-wheel $l$ around until the space 10, formed by the removal of one of the teeth of $k^4$, reaches the tooth 60, and hence there can be no further motion of the type-wheel, because the tooth 60 has nothing to act against, and thereby the type-wheels of the various printing-telegraph machines in the line will all stop when they arrive at the unison-point, even though the levers $m'$ are still operated to bring into unison any type-wheels that may not have arrived at that point. During these motions, the upper pallet $i$ yields as the shaft $g$ and wheel $k$ are turned, and this pallet $i$ acts as a pawl to prevent a reverse movement. The type-wheel will not be printed from in these movements, because the pad $p$ is brought up at the space between one type and the next, the pallets $i$ being in the reverse position to that occupied by them when the printing is effected.

I claim as my invention—

1. The wheel $k^4$ and tooth 60, actuated by the printing-lever $m'$, in combination with the type-wheel $l$, wheel $k$, and pallets $i$, substantially as and for the purposes set forth.

2. Adjusting the type-wheel to the unison-point by the movement of the printing-lever while the type-wheel pallets are in the opposite position to that which they occupy when the type-wheel is being printed from, substantially as set forth.

Signed by me this 29th day of June, A. D. 1872.

T. A. EDISON.

Witnesses:
GEO. D. WALKER,
GEO. T. PINCKNEY.